FIG.3

United States Patent Office 3,684,619
Patented Aug. 15, 1972

3,684,619
APPARATUS FOR MAKING SEALS ON CONTAINERS
Otto Engler, Karlsruhe, Theodor Hammer, Kandel, Pfalz, and Meinhard Müller, Karlsruhe, Germany, assignors to Industrie-Werke Karlsruhe Aktiengesellschaft, Karlsruhe, Germany
Filed May 7, 1970, Ser. No. 35,421
Claims priority, application Germany, Oct. 3, 1969, P 19 49 927.5
Int. Cl. B29c 27/06; B32b 31/20
U.S. Cl. 156—380
23 Claims

ABSTRACT OF THE DISCLOSURE

An apparatus for making transverse seals on collapsible, tubular containers having a laminated wall comprising an inner layer of plastic material and a metal layer outside the plastic layer. The apparatus comprises generating means for generating high-frequency energy and a source of cooling medium associated with the generating means for supplying the cooling medium to the same. Distributing means is spaced from the generating means and the source and flexible conducting means connects the generating means with the distributing means for supplying high-frequency energy and cooling medium from the generating means to the distributing means. Electrode means is connected with the distributing means for receiving high-frequency energy and cooling medium from the same and recirculating means recirculates the cooling medium from the electrode means to the source via the distributing means, the conducting means and the generating means.

BACKGROUND OF THE INVENTION

The present invention relates generally to sealing apparatus, and more particularly to apparatus for making seals on containers. Still more specifically the invention relates to an apparatus for making transverse seals on collapsible, tubular containers.

Specifically, the invention relates to an apparatus for making transverse seals on collapsible tubular containers having a laminated wall which comprises an inner layer of plastic material and a metal layer outside the plastic layer.

It is known to package many goods, particularly if they are of a paste-like character such as tooth paste, cosmetics, pharmaceutical items or the like, in tubes which may consist of metal or of synthetic plastic material. The metal tubes are closed by folding their lower end—which is originally open for permitting insertion of the material—several times to thereby close it. The tubes of synthetic plastic material cannot be closed in this manner but must instead be closed by heat welding, for which purpose various different approaches have been known. However, the use of purely metallic or purely synthetic plastic tubes is frequently possible for packaging of goods. For instance, if certain materials such as foodstuffs are to be packed there exists a danger that the materials might undergo an undesired change in taste or aroma by contact with unsuitable metals or plastic from which the tube is made. Aside from this it is also possible that there could develop an interaction between the material of the tube and the contents which would endanger the health of the user, for instance if the contents are of edible nature.

An attempt has therefore been made to overcome this problem by providing tubes, particularly those in which foodstuffs are to be packed, in laminated form so that they consist of two, three or more layers. On such known tube consists of three layers, namely an inner layer of synthetic plastic material having a low dielectric loss factor, a metallic layer such as aluminum applied exteriorly over the inner layer and an additional outer layer surrounding the metallic layer and consisting of paper and/or synthetic plastic material. In fact, there are now commercially available laminated tubes having as many as eight different layers, namely (counting from the exterior) a layer of transparent high-pressure polyethylene, a printed white high-pressure polyethylene layer, a layer of paper, a layer of high-pressure polyethylene, a layer of copolymer with special adhesive characteristics, a layer of aluminum, a layer of copolymer and an inner layer of high-pressure polyethylene. Of course, the number of layers may vary in dependence upon the chemical and/or physical characteristics of the goods to be packaged.

Such laminated multi-layer tubes are usually produced in that the material is present in form of a stack of foils of the desired materials and arranged in the desired manner. This stack is then severed transversely into individual sections which are then rolled up into cylindrical form whereupon the thus obtained cylinder is provided with a longitudinally extending welded seam along an overlapped region. At one longitudinal end the cylinder is then provided with a shoulder portion of synthetic plastic material which is inserted in a manner known to those skilled in the art and not of interest in the context of the present invention. The shoulder portion is provided with an outlet onto which a closure cap may be secured.

For various reasons it is desirable that the multi-layer or laminated wall tubes be capable of handling in the same manner as conventional tubes having a wall consisting either only of metal or only of synthetic plastic material. It is evidently desirable to be able to process such tubes on existing apparatus, or to at least require no more than auxiliary devices which can be used in conjunction with existing apparatus. When the tubes are ready for filling they have one open end whereas the other is closed by the separately inserted end piece or shoulder piece whose opening is in turn closed by a screw or other cap. The problem which exists at the point of use, that is when the tubes are ready for filling or after filling, is how to close the open ends of the tubes subsequent to filling, keeping in mind that this cannot be done in the same manner as with tubes consisting exclusively of metal or tubes consisting exclusively of plastic. Experience has shown that multi-layer tubes consisting in part of aluminum foil can be advantageously closed by means of the known inductive high-frequency welding method. If, for instance, a metal coil supplied with high-frequency energy and having a circular cross-section is moved over the open tube end of similarly circular cross-section, then a high-frequency induction current will flow in the tubular aluminum layer constituting a part of the multi-layer wall of the tube, and this will heat the aluminum in the region of the coil. Other possibilities exist for employing inductive high-frequency methods so that in place of circular coils it is also possible to use single layer or divided coils, with single-layer stretched or elongated coils being particular suitable.

If the opened end of a filled tube, or of an empty tube for that matter, is collapsed or flattened, and a coil of signle-layer stretched or elongated type is moved adjacent the collapsed end of the tube, then it is evident that the outer annular magnetic force field of the elongated conductor is already sufficient to heat the aluminum layer in the tube wall to such an extent that the inner layer of synthetic plastic material will melt. If the conductor supplying high-frequency energy is initially installed in a press tool which is a non-conductor, then the combination of high-frequency conductor and press tool makes it very simple to heat weld together the abutting portions of the inner tubular layer of plastic material which are in abutment due to the collapse of the tube at the open end thereof and which are heated by the flowing of the inductive current, so that a very reliable closure is effected.

However, there still exist many problems with respect to this type of closure, and apparatus for it, and thus far the art has not provided solutions for them.

SUMMARY OF THE INVENTION

It is, accordingly, an object of the present invention to provide solutions for the aforementioned problems.

More particularly it is an object of the present invention to provide an improved apparatus of the type under discussion.

One of the problems in question is concerned with an apparatus for closing filled tubes on high-output tube-filling machines. Such machines may be single machines, double machines, or multiple machines, for instance quadruple machines of basically known construction. Experience has shown that it is necessary in providing closing apparatus for use with such machines to improve the supply of high-frequency energy from the high-frequency generator to the welding electrodes. Furthermore, it is necessary to make the distributor which receives the high-frequency energy and distributes it to the various welding electrodes, as low-loss in construction as possible and at the same time to guarantee the most even possible distribution of high-frequency energy to the various electrodes. Additionally, it is desirable to improve the operating efficiency of the individual electrodes and further to provide electrical means for improving the entire high-frequency supply and distribution system.

In pursuance of these various objects outlined above, and others which will become apparent hereafter, one feature of the invention resides in an apparatus for making transverse seals on collapsible tubular containers having a laminated wall comprising an inner layer of plastic material and a metal layer outside the plastic layer, such apparatus comprising a combination which includes generating means for generating high-frequency energy and a source of cooling medium which is associated with the generating means for supplying the cooling medium to the same. Distributing means is spaced from the generating means and the source and flexible conducting means connects the generating means with the distributing means for supplying high-frequency energy and cooling medium from the generating means to the distributing means. Electrode means is connected to the distributing means for receiving high-frequency energy and cooling medium from the same and recirculating means serves to recirculate the cooling medium from the electrode means to the source via the distributing means, conducting means and generating means.

The distributing means is of low-loss construction and common to all working runs of the tube filling and closing machine—a working run identifying a series of processing stations through which the tubes move from empty position via filled position to closed position. There may, as pointed out before, one such working run, two working runs or multiple working runs such as four or more of them. The distributing means is periodically movable in the operating rhythm of the machine and it supplies high-frequency energy and cooling medium evenly to all electrodes associated with the respective working runs.

Advantageously the flexible conducting means is composed of two coaxial corrugated metal hoses or the like separated by a thin-walled insulating means and each carrying high-frequency energy. The outer of the metal hoses is coaxially surrounded with clearance by a hose of synthetic plastic material or the like, and this clearance together with the interior of the inner metal hose serve for the supply and recirculation of the cooling medium. The latter may, incidentally, be water.

The distributor means itself is composed essentially of two plano-parallel conductor plates separated by an insulator member and having arranged thereon in correspondence with the number of working runs pairs of two correspondingly configured clamping jaws with each pair being adapted to receive respective ones of the tubular containers, and with one jaw of each pair being provided with a high-frequency carrying electrode to which cooling medium is supplied via conduits stationarily mounted on the plates and receiving cooling medium from the flexible conductor means. It is furthermore advantageous if the electrodes which are respectively associated with the pairs of clamping jaws are electrically connected with one—preferably the upper one—of the plates in such a manner that the plate for guaranteeing equal distribution of high-frequency energy to all electrodes is subdivided electrically into sections which are arranged in mirror-symmetrical relationship.

It is particularly important to consider the materials used in the distributor means, and according to the invention both the plates and the conduit means stationarily mounted on them consisting advantageously of one and the same material. Furthermore, it is advantageous that this material be a metallic material of high purity and equally high electrical and/or thermal conductivity, and that such material be advantageously either copper or aluminum.

Means are also provided according to the present invention for increasing the effectiveness of the electrodes. Such means consist essentially of a mass member or body, such as ferrite or the like, provided for each electrode. The electrodes each have a straight high-frequency carrying portion one surface of which serves for effecting the welding action in the tubular containers. The ferrite core or body so encloses this straight portion that only the aforementioned surface is exposed. The electrodes themselves advantageously are tubular and of quadratic cross-section.

It is furthermore advantageous in accordance with the present invention that the mass core surrounds the electrode substantially rotation-symmetrically, and that it and the electrode be surrounded by a body of synthetic plastic resin or the like which in turn is connected with the distributor means, if desired via an intermediate element.

Furthermore, it is advantageous to provide means for matching the high-frequency system in the tubular flexible conducting means with the distributor means, and to improve the efficiency of both. This is accomplished according to the invention essentially by providing electrical components associated with the distributor means in form of capacitors which are individually connected in parallel with the two plate members. According to a further concept of the invention this is enhanced if the capacitors are mounted at or on the distributor means, preferably in the region where the distributor means is connected with the flexible conducting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
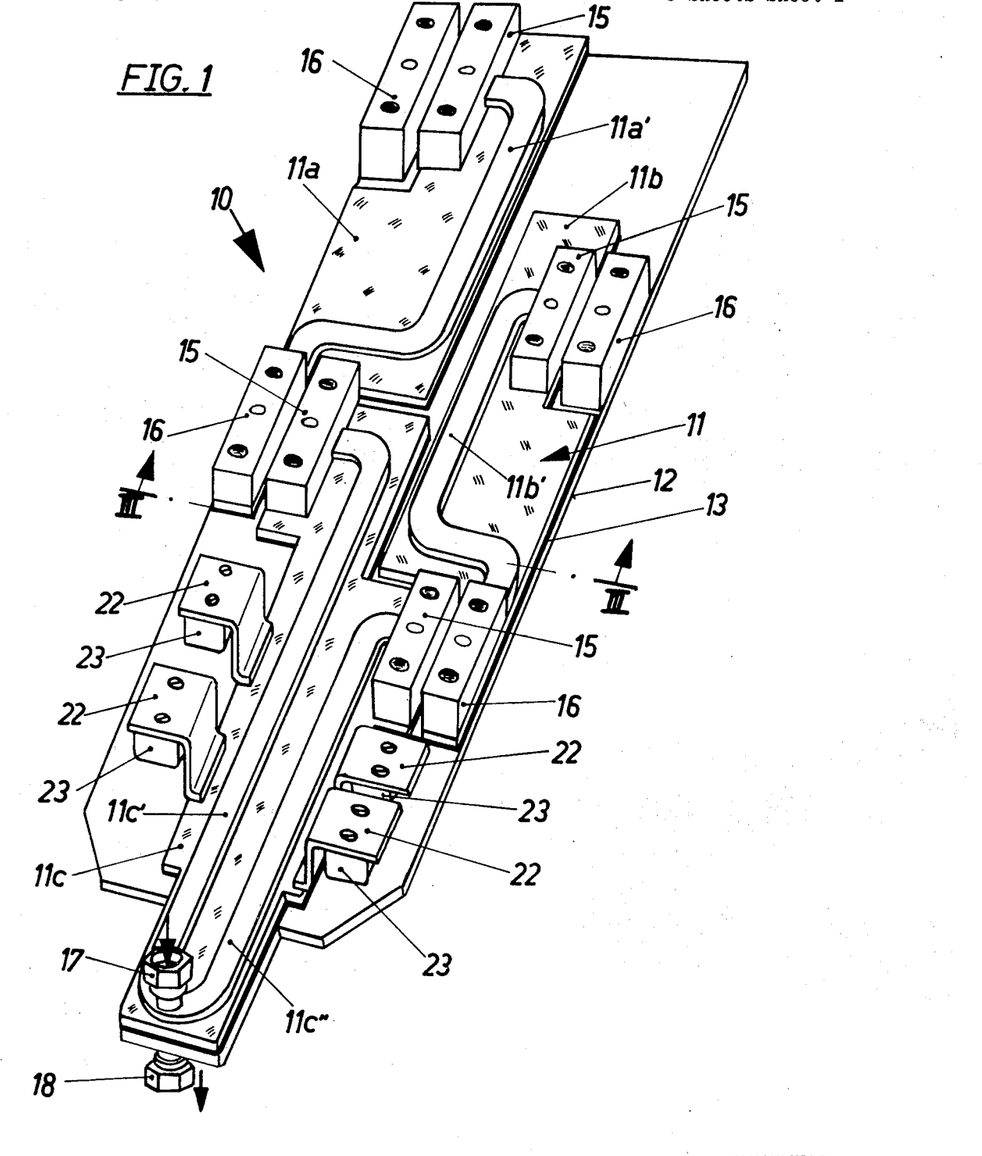
FIG. 1 is a bottom plan view of a distributor means for an apparatus according to the present invention.
Figure 2:
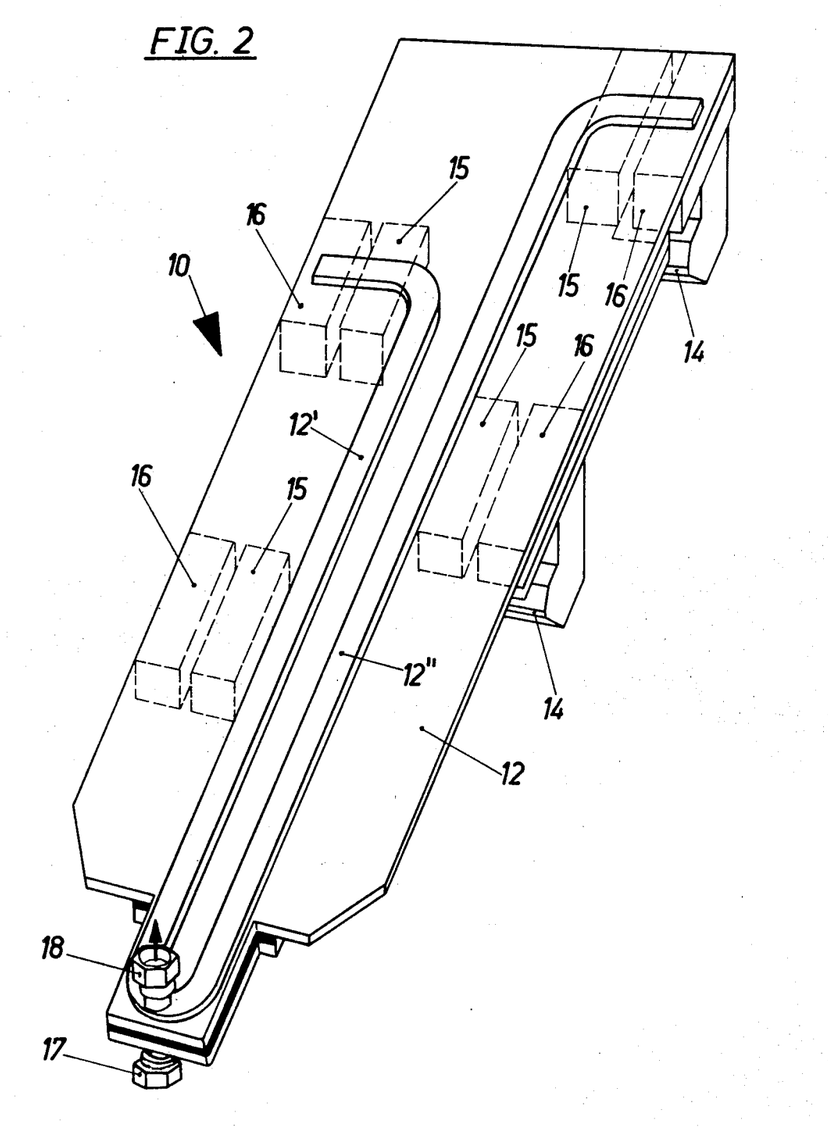
FIG. 2 is a top-plan view of FIG. 1.
Figure 3:
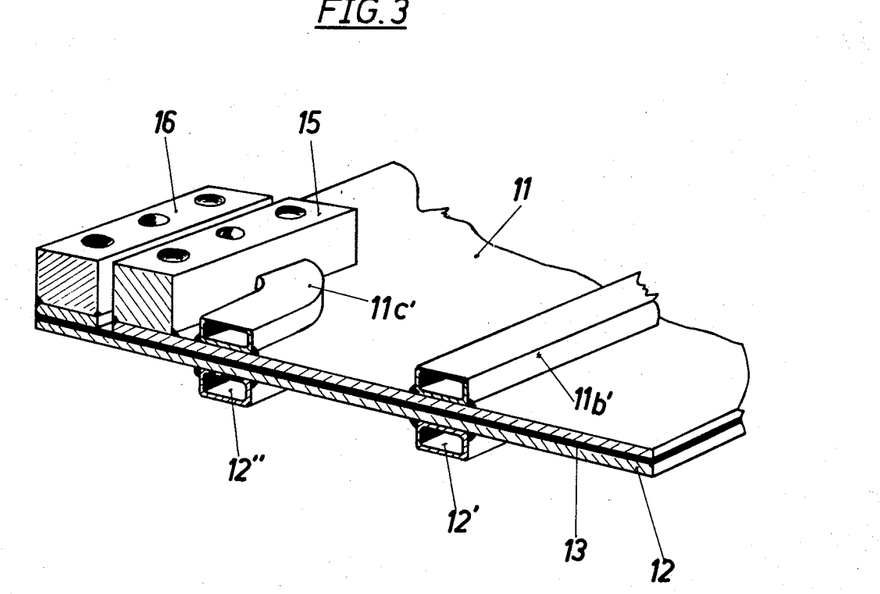
FIG. 3 is a vertical section taken on the line III—III of FIG. 1.

Discussing now firstly the embodiment in FIGS. 1–3, it will be seen that this is the distributor means according to the present invention. It is identified in toto with reference numeral 10 and will be seen to be composed essentially of a lower conductor plate 11 and an upper conductor plate 12 which are separated by a thin but highly effective insulator layer 13, for instance consisting of tetrafluoroethylene, a material which is commercially available under the trade name "Teflon." The lower conductor plate in the illustrated embodiment is composed of several sections 11a, 11b and 11c with the sections 11a and 11b being approximately mirror-symmetrically arranged with reference to one another.

Figure 4:
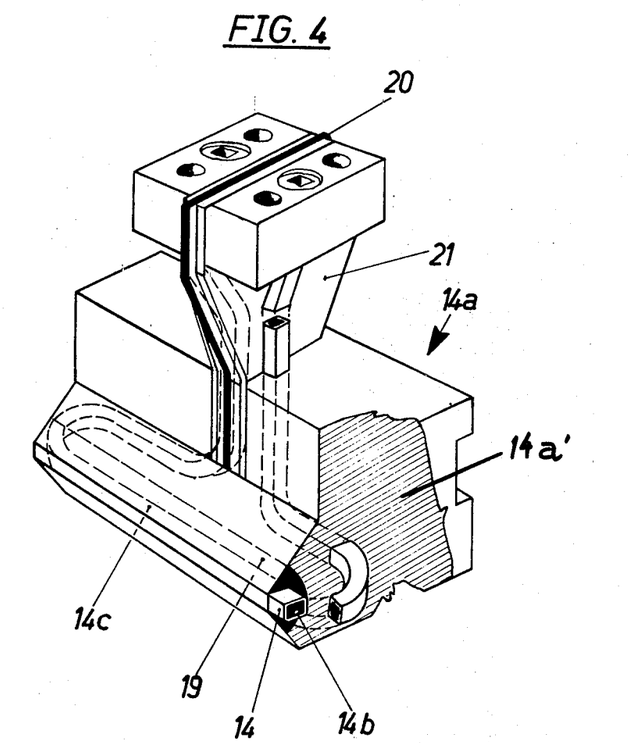
FIG. 4 is a perspective view of an electrode for use with the embodiment in FIG. 1 embedded in a body of synthetic plastic material.

The sections 11a, 11b and 11c are provided with clamping jaws 15 for connection of the electrodes 14 (see FIG. 4). The clamping jaws 15 are correspondingly configurated with the clamping jaws 16 which are mounted insulators on the plate 12.

The distributor means 10 and the electrodes 14, with the latter being hollow as evident from FIG. 4, must be cooled. For this purpose a cooling medium such as water must be supplied which enters in the direction of the arrow (FIG. 1) at the nipple 17 and is from there distributed into conduits 11c' and 11c" which are stationarily mounted on the section 11c of the plate 11. From these conduits the water passes to the first or most adjacent clamping jaws 15 and the associated electrodes 14 (the latter are not shown in FIGS. 1–3). FIG. 4 shows, however, that the water passes through the electrodes 14 which for this reason are tubular, and from there the water passes to the next-following clamping jaws 16 to proceed via the stationarily mounted conduits 11a', 11b' (on the sections 11a and 11b of plate 11) and then on to the clamping jaws 15, the associated electrodes 14 and the clamping jaws 16 which are farthest from the inlet nipple 17. The cooling water is then recirculated from these farthest clamping jaws 16 to the conduits 12', 12" which are stationarily mounted in the upper plate 12 as shown in FIG. 2, and these join in the proximity of the outlet nipple 18 through which cooling medium leaves the conductor means in the direction of the arrow shown in FIG. 2.

The high-frequency energy to and from the electrodes 14 is supplied in the same manner as just outlined with respect to the supply of cooling medium. In other words, the high-frequency energy flows in the same manner. The counter-jaws which cooperate and are correspondingly configurated with the clamping jaws 14a of FIG. 4, and which serve for grounding purposes with reference to the high-frequency energy, have been omitted to avoid confusion.

FIG. 4 shows the electrodes 14 which primarily serve for effecting the welding-shut of the closed ends of collapsible tubular containers of the type under discussion. Such containers are not illustrated because they themselves do not constitute a part of the present invention. However, it is thought that the invention is readily understandable without a showing of the containers. In any case, tube filling apparatus of the type with which the present invention is to be utilized and intended for use with such containers, is well known and is, for instance, disclosed in Swedish Pat. No. 214,417 to which reference may be had if necessary. The electrode 14 is illustrated on an enlarged scale in FIG. 4. As shown there, it is in form of a loop-shaped tubular inductor 14 of preferably but not necessarily quadratic cross-section. The cooling medium flows through the hollow interior 14b of the inductor 14 as mentioned before. The electrode 14 further has a straight portion 14a which faces the tube whose end is to be welded shut and this portion 14a is surrounded over its entire length by a mass core 19 consisting of ferrite or like material. Only that side of the portion 14 which directly faces the tube to be welded is exposed as indicated at 14c. The electrode 14 together with the core 19 is embedded in a block or body 14a' of synthetic plastic resin material which is so configurated that it simultaneously constitutes a clamping jaw which clampingly engages and exerts pressure upon the open end of a tube which is to be welded shut. The clamping jaw 14a is connected with a two-part intermediate member 21, whose parts are separated by an insulator 20, and the intermediate member 21 in turn is mounted on the correspondingly configurated clamping portions or jaws 15, 16 shown in FIG. 1.

Figures 5, 6:
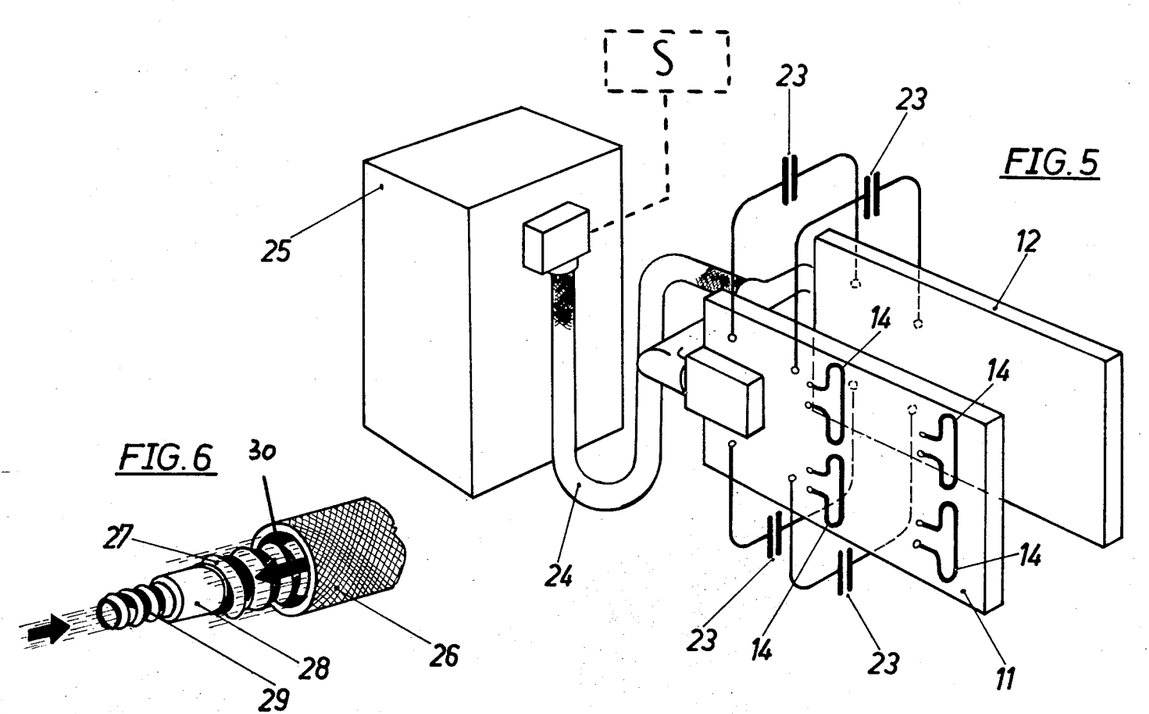
FIG. 5 is a diagrammatic orientational view showing the high-frequency generator, the conducting means, the distributor means and capacitors connected with the latter.
FIG. 6 is a transverse section through the conducting means according to the present invention.

In the embodiment of FIG. 5 a diagrammatic representation has been made of the constituent components of the described and disclosed system. The insulator 13 has been omitted and the two conductor plates 11 and 12 have been diagrammatically shown. They are connected via the flexible conductor means 24 still to be described, with a high-frequency generator 25 of known construction. The generator 25 in turn is connected with a source S of cooling medium, such as water. Thus, high-frequency energy as well as cooling medium is supplied from the generator 25 via the conductor means 24 and the plate 11 to the electrodes 14 and thus to the tubes (not shown) to be welded, and from there via the plate 12 and the conductor means 24 back to the generator 25. The flow of cooling medium is the same. To match the distributing means 10 and the high-frequency supply system and to improve their efficiency, capacitors 23 are provided which are mounted via the holding members 22 shown in FIG. 1 on the distributing means 10. The drawing (FIG. 5) shows that the capacitors 23 are individually connected in parallel with the plates of the distributing means 10. It has been found both advantageous and advisable that the capacitors 23 are mounted at or on the distributor means 10 in the region where the latter is connected with the flexible conducting means 24.

As FIG. 6 shows, the flexible conducting means 24 is in form of a coaxial member which is composed of an outer sheath of flexible synthetic plastic material 26 in which there is arranged with clearance a flexible outer tubular member 27 which in the illustrated embodiment is a corrugated metallic hose and serves for high-frequency transmission. Inside the member 27 there is provided an insulator 28 and inside that an inner flexible corrugated metallic hose 29 which also serves for high-frequency transmission. The cooling water from source S is supplied to the generator 25 and flows from there through the interior of the hose 29 in the direction of the arrow shown in FIG. 6; recirculation is effected through the annular gap or clearance 30 between the synthetic plastic sheath 26 and the outer metallic hose 27 in the direction of the second arrow in FIG. 6 which is opposite the first-mentioned arrow. Thus, cooling water is recirculated to the generator 25 through this annular gap or clearance 30. Evidently, the flow relationships could be reversed if desired.

The advantages obtained with the construction according to the present invention will be readily understood.

Firstly, it is necessary to keep in mind that inductively operating high-frequency electrodes generally operate at low potential and therefore with relatively high currents. However, the resonant circuits used in known high-frequency generators supply high potential and low current, that is precisely the reverse. To make it possible to meet the aforementioned requirements with reference to the operation of inductively working high-frequency electrodes, it is necessary to provide for inductive coupling of a conductor or supply means to thereby achieve the desired and necessary current and potential conditions. The supply of a low-current high-frequency energy to the distributor means and into the electrodes constitutes a particular problem because the high-frequency electrodes are associated with clamping jaws which periodically open and close to eject a welded tubular container and to receive a new one. Known flexible litz, that is flat or round bands of fine copper wire mesh, are not suited for transmitting high-frequency energy because the movements associated with the opening and closing of the jaws disadvantageously influence—because of the skin effect—the circumstances relative to the current distribution. This results not only in an impermissibly high heating of the copper litz but also in inaccurate and uneven supply of energy to the electrodes. Of course, this in turn results in a significant reduction in the quality of a welded seam which is produced.

While it has been attempted in the art to provide two copper sheet metal strips of approximately 1 mm. strength and between 100 and 150 mm. width which are superimposed and separated by an insulator and together bent to U-shaped configuration, it has been found that such a member, which was inserted as a connector between the movable welding electrodes on the one hand and the stationary high-frequency supply on the other, is inadequate for several reasons. One of these is that such as member has only limited freedom of flexibility and at most is flexible along one axis. Furthermore, its use in industrial applications is possible within only very limited ranges because it is subject to very considerable heating. Removal of heat is possible only by air convection or radiation. This in turn of course requires that the thus-produced member must be very large if its temperature is to be within reasonably acceptable limits.

Other suggested approaches also have not been found satisfactory for various reasons. The present invention, however, overcomes these disadvantages by provision of the conducting means illustrated in FIG. 6. Not only is this exceedingly flexible in all directions, but it is capable of transmitting rather high induction currents. Furthermore, heat which develops in operation is carried off effectively and reliably by the water flowing through the flexible conducting means in two directions, that is both to and away from the electrodes. The same efficiency and advantages are of course true also with respect to the distributing means 10. A further particular advantage is also to be seen in the fact that the supply means for the high-frequency energy and the supply means for the cooling medium are unitary, thereby avoiding the necessity for several individual conductors and leaving the region of the apparatus free from clutter and the attendant dangers of accident.

A further problem overcome with the present invention is the fact that the construction and configuration of known devices not only results in losses of high-frequency energy, but also in uneven supply of energy to the individual welding electrodes. As a result of this the welded seams produced by the individual electrodes associated with the various working runs are at least of uneven quality, and greater difficulties may also occur. The problem can be overcome only by supplying the high-frequency energy evenly and equally to all welding electrodes of the apparatus, a problem to which a solution has not heretofore been found. According to the present invention, however, this difficulty has been overcome by providing a multi-section distributor means. Not only does this provide for high operating safety because heating of the distributor means—at least in excess of acceptably low limits—through the high-frequency energy is avoided by the intense cooling afforded by the flowing cooling medium, such as cooling water. Evidently, this advantage is also true with respect to the welding electrodes which remain almost cool whereby of course their life expectancy is significantly increased. In fact, this effective cooling of the electrodes is particularly important because their construction as high-frequency energy carrying inductive loops necessarily causes them to be the weakest link in the chain of all energy-carrying components of such an apparatus.

The distributor means also is of low-loss construction because its two plates are in very tight and close relationship separated only by a thin but highly effective insulator. Thus, the arrangement is free to all intents and purposes of high-frequency sweep radiation or interference. Furthermore, the mirror-symmetrically reversed configuration and arrangement of the individual sections of which the lower plate 11 in the illustrated embodiment is composed, also assures a very even distribution of high-frequency energy to all electrodes, whereby identically high quality of all welded seams produced by the various electrodes is guaranteed.

Known high-frequency loops serving as welding electrodes are in form of thin inadequately cooled tubes of circular or quadratic cross-section. By contrast, the present invention surrounds the straight portion of the respective electrode with a cylindrical mass core which may consist of ferrite or the like, and which leaves only that side of the electrode free which actually effects the welding operation and in juxtaposed with the container to be welded. In this manner, the inductive resistance of the electrodes is increased and this causes a stronger force line concentration at the welding line and an increased potential drop over the electrode. This, in turn, makes it possible to utilize shorter welding times which is evidently the same as saying that the machine has an improved output rate.

The use of the disclosed capacitors, and their location in the apparatus, provides for a matching of the high-frequency system composed of the flexible conducting means, the distributing means and the welding electrodes to the generator, and at the same time serves to improve the operating efficiency.

Tests have indicated that the desired matching to the generator is indeed obtained, as the measured values in the following table will indicate.

| | Generator potential [UG] | Potential at the distributing means [UV] | Potential at the individual electrodes [UE] | Generator load [percent] |
|---|---|---|---|---|
| Number of capacitors: | | | | |
| 0 | 300 | 130 | 1.=61<br>2.=59<br>3.=58<br>4.=62 | 100 |
| 4 | 300 | 200 | 1.=89<br>2.=88<br>3.=98<br>4.=91 | 85 |

The potential drop at the flexible conducting means was decreased from 170 to 100 v. whereas the potential at the electrodes increased from an average of 60 to an average of 90 v. The load on the generator decreased from originally 100% (in the absence of any capacitors) to 85% (when four capacitors were used).

It will be understood that each of the elements described above, or two or more together, may also find a useful application in other types of constructions differing from the types described above.

While the invention has been illustrated and described as embodied in an apparatus for making transverse seals on collapsible, tubular containers having a laminated wall, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential charateristics of the generic or specific aspects of this

What is claimed as new and desired to be protected by Letters Patent is set forth in particular in the appended claims.

We claim:

1. In an apparatus for making transverse seals on collapsible, tubular containers having a laminated wall comprising an inner layer of plastic material and a metal layer outside said plastic layer, a combination comprising generating means for generating high-frequency energy; a source of cooling medium associated with said generating means for supplying such cooling medium to the same; distributing means spaced from said generating means and said source; flexible coaxial conducting means connecting said generating means with said distributing means for coaxially supplying high-frequency energy and cooling medium to the same; electrode means connected to said distributing means for receiving high-frequency energy and cooling medium from the same; and recirculating means for recirculating said cooling medium from said electrode means to said source via said distributing means, conducting means and generating means.

2. In an apparatus as defined in claim 1, said distributing means being periodically displaceable between a first and a second position in correspondence with the operating rhythm of said apparatus.

3. In an apparatus as defined in claim 1; further comprising enhancing means for enhancing the operational effectiveness of said electrode means.

4. In an apparatus as defined in claim 1, said flexible conducting means comprising a pair of coaxial flexible electrically conductive tubular members, insulating means between said members, and a flexible electrically neutral tubular sheath surrounding the outer of said electrically conductive tubular members coaxially and with clearance, the interior of the inner tubular member and the clearance between the outer tubular member and said sheath serving for passage of said cooling medium to and from said electrode means.

5. In an apparatus as defined in claim 4, wherein said clearance constitutes said recirculating means.

6. In an apparatus as defined in claim 1, wherein said cooling medium is water.

7. In an apparatus for making transverse seals on collapsible, tubular containers having a laminated wall comprising an inner layer of plastic material and a metal layer outside said plastic layer, a combination comprising generating means for generating high-frequency energy; a source of cooling medium associated with said generating means for supplying cooling medium to the same; distributing means spaced from said generating means and said source; flexible conducting means connecting said generating means with said distributing means for supplying high-frequency energy and cooling medium to the same, said conducting means comprising a pair of coaxial corrugated electrically conductive metallic hoses, insulating means between said hoses, and a flexible sheath of non-conductive synthetic plastic material surrounding the outer of said hoses coaxially and with clearance, the interior of the inner hose and the clearance between the outer hose and said sheath serving for passage of said cooling medium; electrode means connected to said distributing means for receiving high-frequency energy and cooling medium from the same; and recirculating means for recirculating said cooling medium from said electrode means to said source via said distributing means, conducting means and generating means.

8. In an apparatus for making transverse seals on collapsible, tubular containers having a laminated wall comprising an inner layer of plastic material and a metal layer outside said plastic layer, a combination comprising generating means for generating high-frequency energy; a source of cooling medium associated with said generating means for supplying cooling medum to the same; distributing means spaced from said generating means and said source and comprising a pair of planoparallel plate members, an electrically insulating layer between said plate members, at least two pairs of clamping jaws for said tubular containers on one of said plate members and stationary conduit means at the exterior of said plate members and communicating with said electrode means for passage of said cooling medium; flexible conducting means connecting said generating means with said stationary conduit means for supplying high-frequency energy and cooling medium to the same; electrode means carried by one of said jaws of end pair of jaws and being connected to said distributing means for receiving high-frequency energy and cooling medium from the same; and recirculating means for recirculating said cooling medium from said electrode means to said source via said distributing means, conducting means and generating means.

9. In an apparatus as defined in claim 8, said one plate member being composed of electrically conductive sections configurated in mirror-reversed relationship and electrically conductively connected with said flexible conducting means and the respective electrode means for effecting equal distribution of high-frequency energy to all of said electrode means.

10. In an apparatus as defined in claim 9, said plate members comprising a lower and an upper plate member, and wherein said one plate member is said upper plate member.

11. In an apparatus as defined in claim 8, said plate members and said conduit means consisting of identical material.

12. In an apparatus as defined in claim 8, said plate members and said conduit means consisting of metallic material of high purity and high conductivity.

13. In an apparatus as defined in claim 12, wherein said material has high electrical conductivity.

14. In an apparatus as defined in claim 12, wherein said material has high thermal conductivity.

15. In an apparatus as defined in claim 12, wherein said material has high thermal and electrical conductivity.

16. In an apparatus as defined in claim 12, wherein said material is selected from the group composed of copper and aluminum.

17. In an apparatus as defined in claim 8; further comprising electrical capacitor means connected in parallel with the respective plate members for specifically matching said distributing means electrically with said flexible conducting means supplying said high-frequency energy.

18. In an apparatus as defined in claim 17, said capacitor means being mounted on said plate members.

19. In an apparatus as defined in claim 18, said capacitor means being mounted on said plate members in the region of electrical connection between said flexible conductor means and said plate members.

20. In an apparatus for making transverse seals on collapsible, tubular containers having a laminated wall comprising an inner layer of plastic material and a metal layer outside said plastic layer, a combination comprising generating means for generating high-frequency energy; a source of cooling medium associated with said generating means for supplying cooling medium to the same; distributing means spaced from said generating means and said source; flexible conducting means connecting said generating means with said distributing means for supplying high-frequency energy and cooling medium to the same; electrode means connected to said distributing means for receiving high-frequency energy and cooling medium from the same, said electrode means including a straight electrode portion carrying said high-frequency energy; enhancing means for enhancing the operational effectiveness of said electrode means and including a mass-increasing body surrounding said straight electrode portion but leaving a contact side thereof exposed; and recirculating means for recirculating said cooling medium from said electrode means to said source via said distributing means, conducting means and generating means.

21. In an apparatus as defined in claim 20, wherein said body consists at least essentially of ferrite.

22. In an apparatus as defined in claim 20, wherein at least said straight portion is of quadratic cross-section.

23. In apparatus as defined in claim 20; and further comprising a mass of synthetic plastic material surrounding and at least in part encapsulating said electrode means and body, said mass being connected to said distributing means.

References Cited
UNITED STATES PATENTS

| | | | |
|---|---|---|---|
| 3,462,336 | 8/1969 | Leatherman | 156—380 X |
| 3,438,428 | 5/1969 | Balamuth et al. | 156—380 X |

BENJAMIN A. BORCHELT, Primary Examiner

J. J. DEVITT, Assistant Examiner

U.S. Cl. X.R.

156—583